United States Patent [19]
Herbst et al.

[11] 3,765,631
[45] Oct. 16, 1973

[54] RESILIENT GIMBAL MOUNTING

[75] Inventors: Paul T. Herbst; Lawrence A. Bergman, both of Erie, Pa.

[73] Assignee: Lord Corporation, Erie, Pa.

[22] Filed: Aug. 6, 1971

[21] Appl. No.: 169,669

[52] U.S. Cl.................. 248/204, 248/179, 248/183
[51] Int. Cl............................................ F16m 13/00
[58] Field of Search.................... 248/179, 183, 184, 248/204, 358 R

[56] References Cited
UNITED STATES PATENTS
2,214,516  9/1940  Vernon.............................. 248/183
3,163,039  12/1964  Newman et al................. 248/184 X

*Primary Examiner*—William H. Schultz
*Attorney*—James W. Wright

[57] ABSTRACT

A plurality of three nested gimbal frames are provided with the intermediate frame supporting the inner frame for relative translational movement along a first axis and the outer frame supporting the intermediate frame for relative translational movement along a second axis at a right angle to the first axis. Elastomeric means resiliently mount the frames and accommodate the relative translational movements predominately in shear while being resistant to relative rotational movement in a plane parallel to the first and second axis by being predominately loaded in compression. The resilient gimbal mounting is, thus, characterized in its relatively low spring rate in designated translational modes and its relatively high spring rate in at least one designated rotational mode.

9 Claims, 4 Drawing Figures

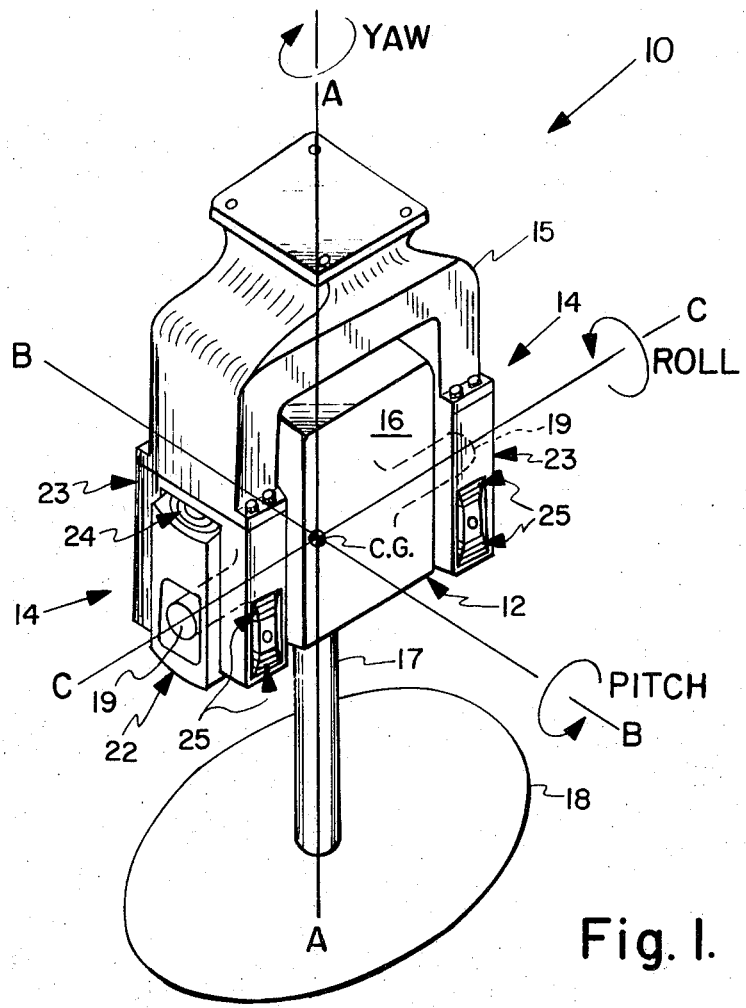
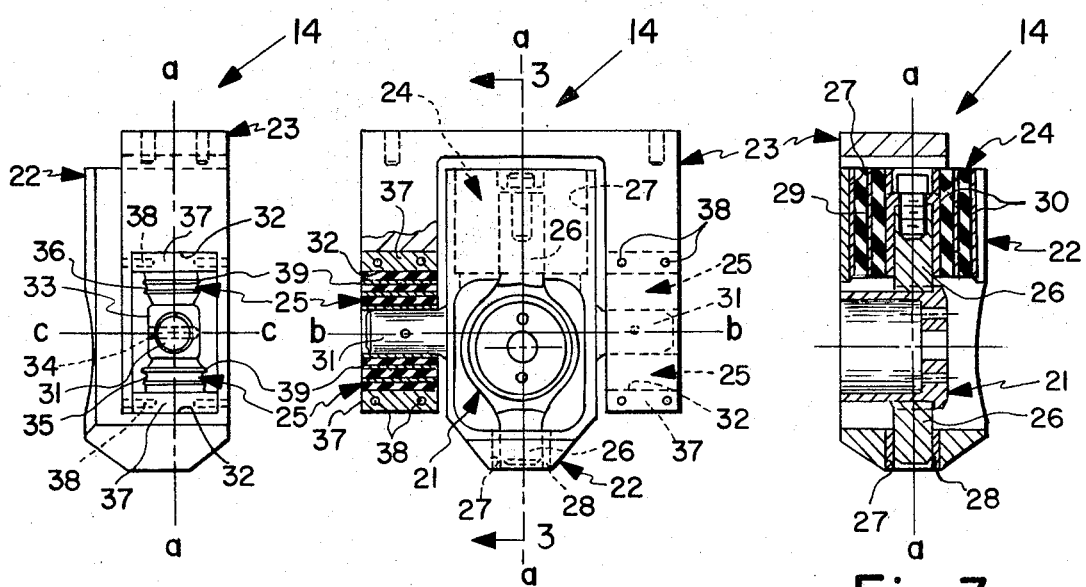
Fig. 1.
Fig. 4. Fig. 2. Fig. 3.

RESILIENT GIMBAL MOUNTING

This invention relates generally to a gimbal mounting and more particularily to a resilient gimbal mounting having a relatively low spring rate in designated translational directions while having a relatively high spring rate in at least one designated rotational direction.

A resiliently mounted system has six principal degrees of freedom of movement or modes in which movement may occur. These are equally divided between translational and rotational modes. The former are motions along each of the principal axis of the system. The latter are motions about each principal axis.

In resiliently mounting various equipment for vibration isolation, it is essential that the natural frequency of the mounting system be substantially less than, usually by at least a factor of the square root of two, the excitation or distributing frequency to be isolated. This applies for each vibrational mode whether translational or rotational. As is well known in vibration isolation technology, the natural frequency of the mounting system for each mode of vibration is a direct function of the mass of the system and the spring rate in that mode. Since the mass of the system cannot be readily varied for purposes of vibration isolation, control of the spring rate for a given mode typically becomes the means by which vibration isolation is accomplished.

Most equipment is subject to vibration excitation or disturbance in a plurality of modes of different frequency and magnitude. To effectively isolate such equipment, the mounting system may dictate a low spring rate for certain modes of vibration and a high spring rate for certain other modes of vibration. A high spring rate is desired (limits motions) where such can be used and still provide the required degree of vibration isolation.

In other cases, the equipment to be mounted is very sensitive, for proper operation, to movement in certain modes such as rotational modes. A mounting system for such equipment, while isolating vibration in other modes, must be maintained relatively stiff in the sensitive rotational modes. The resilient gimbal mounting of the present invention to be hereinafter described is illustrated for mounting equipment which is sensitive for proper operation to movement in a designated rotational mode.

With the above in mind, it is the object of the present invention to provide a resilient gimbal mountng having a relatively low spring rate for vibration isolation in designated translational modes and a relatively high spring rate for stability in at least one designated rotational mode.

Briefly, the object of the present invention is accomplished in a resilient gimbal mounting comprising three nested gimbal frames. An inner rigid gimbal frame is adapted to be connected to a structure to be supported. An intermediate rigid gimbal frame is disposed about and spaced from the inner frame and an outer rigid gimbal frame adapted to be mounted on a supporting structure is disposed about and spaced from the intermediate frame. Elastomeric means mount the inner frame and intermediate frame for resilient relative translational movement along a first axis and accommodate the relative translational movement predominately in shear. Other elastomeric means mount the intermediate frame and outer frame for resilient relative translational movement along a second axis at a right angle to the first translational axis and accommodate translational movement along the second axis predominately in shear. The elastomeric means are resistant to relative rotational movement between the inner and intermediate and intermediate and outer frames, respectively, in a plane parallel to the first and second translational axis by being predominately loaded in compression.

In a preferred embodiment, the inner gimbal frame has diametrically opposed outwardly extending projections received in diametrically opposed pockets of the intermediate gimbal frame for relative translational movement axially of the inner gimbal frame projections. Elastomeric means is employed to mount at least one of the projections and accommodates the relative translational movement predominately in shear. Similarly, the intermediate gimbal frame has diametrically opposed projections at a right angle to the inner gimbal frame projections received in diametrically opposed pockets of the outer gimbal frame for relative translational movement axially of the intermediate gimbal frame projections. Elastomeric means is likewise employed to mount at least one of the intermediate frame projections and accommodates such translational movement predominately in shear. The elastomeric means are resistant to relative rotational movement between the inner and intermediate and intermediate and outer frames, respectively, in a plane parallel to the axis of the inner and intermediate frame projections by being predominately loaded in compression. The resistance of the elastomeric means to relative rotational movement may be and preferably is enhanced by embedding and bonding to the elastomeric one or more elongate non-extensible shims parallel to the axis of the projections. Such shims while adding to the compressive resistance of the elastomer has substantially no effect on the ability of the elastomer to accommodate relative translational movement in shear parallel to the elongate axis of the shims.

Some of the objectives of the invention having been stated, other objects will appear as the description proceeds, when taken in connection with the accompanying drawings, in which:

FIG. 1 is a perspective view of a mounting system employing a pair of resilient gimbal mountings of the present invention;

FIG. 2 is an enlarged front elevational view with portions broken away of one of the resilient gimbal mountings of FIG. 1;

FIG. 3 is a sectional view taken substantially along the line 3—3 of FIG. 2; and FIG. 4 is a side elevational view of the resilient mounting of FIG. 2.

Referring more specifically to the various Figures wherein like reference characters are employed to indicate like parts, there is shown in FIG. 1 a mounting system, generally designated at 10, for a radar scanning device 12 utilizing a pair of the resilient gimbal mountings 14 of the present invention.

Briefly, the mounting system 10 includes an inverted U-shaped suspension bracket 15, the body of which is adapted to be secured to the underside of an aircraft (not shown) which ultimately provides the supporting structure for the radar scanning device 12. A resilient gimbal mounting 14 is carried by each leg of the bracket 15 in axially spaced relation to each other. The radar scanning device 12 includes a servo-mechanism housing 16, and a spindle 17 extending from the housing 16 with the remote end thereof journaled to a reflector or screen 18. The servo-mechanism of housing 16 and drive connections (not shown) facilitate the selective movement of screen 18 for proper operation of the radar scanning device 12. The housing 16 has diametrically opposed trunnions 19 suspended by the two spaced resilient gimbal mountings 14 to mount the radar scanning device 12 relative to the bracket 15.

For reference purposes the six degrees of freedom of movement of radar scanning device 12 includes principal translation axis A—A, B—B and C—C and yaw, pitch and roll rotational axis as designated in FIG. 1 about the translational axes respectively. The center of gravity, C.G., of the radar scanning device 12 is preferably as shown located at the intersection of the translational axes.

To prevent the inclusion of an unnecessary description of the structure and operation of the radar scanning device 12, the vibration isolation problems and the stability criteria sssociated therewith, it is sufficient for the description of the present invention to know that it is desirable that the mounting system 10 for the radar scanning device 12 have a relatively low spring rate along translational axes A—A, B—B and C—C and a relatively high spring rate about the yaw, pitch and roll rotational axes. As will be noted in FIG. 1, the roll axis extends transversely of the legs of the bracket 15 or axially of the trunnions 19, centrally of the resilient gimbal mountings 14. In providing relatively high spring rates for the yaw and pitch axes, the moment arms from the center of gravity, C.G., of the radar scanning device 12 to the resilient gimbal mountings 14 play a favorable role in the control of the spring rates in these rotational modes. However, in the roll mode the resistance to rotational motion must be and is wholly contained within the resilient gimbal mountings 14 to be hereinafter more fully described. Accordingly, the description of the resilient gimbal mountings 14 will concenate on the structure that provides the low spring rates in the translational modes and the high spring rate in the roll (rotational) mode.

The resilient gimbal mountings 14, FIGS. 2—4, comprise a plurality of three nested gimbal frames, an inner rigid gimbal frame 21, an intermediate rigid gimbal frame 22 and an outer rigid gimbal frame 23. The inner frame 21 receives the trunnion 19 to support the radar scanning device 12 and is itself supported by the intermediate frame 22 for relative translation resilient movement along a first axis, $a—a$, by elastomeric means 24 which accommodates the relative translational movement along the $a—a$ axis predominately in shear. The intermediate frame 22 is supported by the outer frame 23 for relative translational resilient movement along a second and third mutually perpendicular axes, $b—b$ and $c—c$, respectively, both of which are at right angles to the first axis, $a—a$, by elastomeric means 25 which accommodates the relative translational movement along the second and third axes $b—b$ and $c—c$ predominately in shear. As previously indicated, the outer frame 23 is rigidly connected to the bracket 15. The $a—a$ axis is parallel to the A—A axis. The $b—b$ axis is parallel to the B—B axis. The $c—c$ axis is parallel and coincident with the C—C axis. Thus, relative motion in the mounting system 10 along a translational axis causes translational movement in the resilient gimbal mountings 14. Since elastomer is relatively soft in shear as compared to compression, the resilient gimbal mountings 14 and the mounting system 10 have a relatively low spring rate in the principal translational modes. However, in the rotational or roll mode about the $c—c$ axis, each of the elastomeric means 24 and 25 are loaded predominately in compression and thus, imparts to the mounting system 10 a relatively high spring rate about the C—C axis or in the roll (rotational) mode.

For a more detail understanding of the present invention, the inner rigid gimbal frame 21 comprises a cup shaped member, FIG. 3, adapted to receive trunnion 19 through the open end which may be fixedly secured thereto by threading bolts (not shown) through apertures in the closed end of the cup shaped member into the trunnion 19. The intermediate rigid gimbal frame 22 encircles and is spaced from the inner frame 21. The inner frame 21 has dimetrically opposed inner frame projections 26 which extend outwardly therefrom at substantially a right angle to the opening therein received in diametrically opposed pockets 27 in the intermeidate frame 22. The longitudinal axis of the projections 26 define the first translational axis $a—a$ of the resilient gimbal mounting 14. One of the projections 26 is mounted in a pocket 27 by a frictionless tubular bushing 28 for relative sliding translational movement along the $a—a$ axis. The other projection 26 is mounted in the other pocket 27 by elastomeric means 24. The elastomeric means 24 comprises a tubular or annular elastomeric body circumferentially disposed about the projection 26 and $a—a$ axis and secure between the projection 26 and intermediate frame 22 so that relative translational motion along the $a—a$ axis between the inner and intermediate frames 21 and 22 is accommodated in shear. Relative rotational motion between the inner and intermediate frames 21 and 22 about the C—C axis is resisted by predominately compression loading of the elastomeric means 24. The load carrying ability or resistance of the elastomeric means 24 to relative rotational motion about the C—C axis may be and preferably is enhanced by embedding and bonding to the elastomer one or more elongate cylindrical or tubular shims 29 of non-extensible material concentric with the $a—a$ axis and normal to the $c—c$ axis. Such shims 29 have no noticeable effect on the ability of the elastomeric means 24 to shear in accommodating relative translational motion between the inner and intermediate frames along the $a—a$ axis. To facilitate manufacture and assembly of the resilient gimbal mounting 14, the elastomer means 24 may be separately manufactured and assembled in the pocket 27 of the intermediate frame about the projection 26. This may be accomplished by providing concentric cylindrical tubes 30 of nonextensible material between which the elastomeric body is bonded. The outer tube may be press fitted or otherwise secured in the pocket 27 and the inner tube fixedly secured to the projection 26 such as by a bolt or the like. This manner of manufacture and assembly allows precompression of the elastomer body which eliminates detrimental tensile stresses therein during operation. Elastomeric means such as means 24 may be used to mount both the projections 26 and may take on other forms as dictated by the particular design criteria to be met without departing from the present invention.

The outer rigid gimbal frame 23 is in the form of an inverted U-shaped member the body of which is adapted to be rigidly connected to a supporting structure such as bracket 15. The legs of the outer frame 23 straddle the intermediate frame 22 in spaced relation thereto without interference with the inner frame 21. The intermediate frame 22 has diametrically opposed projections 31 extending outwardly therefrom at a right angle to the inner frame projections 26 received in diametrically opposed pockets 32 in the spaced legs of the outer frame 23. The longitudinal axis of the projections 31 define the second translational axis $b-b$. The third translational axis $c-c$ is mutually perpendicular to the first and second translational axes $a-a$ and $b-b$. The projections 31 are mounted in the pockets 32 for relative translational resilient motion between the intermediate and outer gimbal frames 22 and 23 along both the $b-b$ and $c-c$ translational axes by elastomeric means 25.

Elastomeric means 25, as best illustrated in FIGS. 2 and 4, includes a block 33 having opposed planar surfaces mounted on projection 31 by pin 34. Separate elastomer bodies 35 and 36 are disposed and bonded between opposite sides of the block 33 and the sides of the pocket 32. To facilitate manufacture and assembly of the resilient gimbal mounting 14, the elastomeric means 25 may be separately manufactured and assembled in the pockets 32 of the outer frame 23. This may be accomplished by providing a planar plate 37 to which the elastomer bodies 35 and 36 are bonded. Once located in the pockets 32, the plates 37 may be anchored in place to the outer frame 23 such as by anchor pins 38. This manner of manufacture and assembly allows precompression of the elastomer bodies 35 and 36 which eliminates detrimental tensile stresses therein during operation. It will be seen that relative translational motions between the intermediate and outer frames 22 and 23 along the $b-b$ and $c-c$ axes will be accommodated predominately in shear. However, relative rotational motion about the roll axis $c-c$ or in a plane parallel to the translational axes $a-a$ and $b-b$ will be resisted by compression loading of the elastomer bodies 35 and 36. This resistance may be and preferably is enhanced by embedding in and bonding to the elastomer bodies 35 and 36 one or more nonextensible spaced planar shims 39 parallel to the $b-b$ and $c-c$ axes. It will be apparent that elastomeric means 25 may take on other forms as dictated by the particular design criteria to be met without departing from the present invention.

In the drawings and specification, there has been set forth a preferred embodiment of the invention, and although specific terms are employed, they are used in a generic and descriptive sense only and not for purposes of limitation.

What is claimed is:

1. A resilient gimbal mounting characterized in its relatively low spring rate in designated translational directions while having a relatively high spring rate in at least one designated rotational direction, said mounting comprising an inner rigid gimbal frame adapted to be connected to a structure to be supported, an intermediate rigid gimbal frame disposed about spaced from said inner frame, elastomeric means mounting said inner frame and intermediate frame for resilient relative translational movement along a first axis and accommodating said relative translational movement predominately in shear, an outer rigid gimbal frame adapted to be mounted on a supporting structure disposed about and spaced from said intermediate frame, elastomeric means mounting said intermediate frame and outer frame for resilient relative translational movement along a second axis at substantially a right angle to said first translational axis and accommodating said latter translational movement predominately in shear, said elastomeric means being resistant to relative rotational movement between said inner and intermediate and outer frames, respectively, in a plane parallel to each of said translational axis by being predominately loaded in compression.

2. A resilient gimbal mounting characterized in its relatively low spring rate in designated translational directions while having a relatively high spring rate in at least one designated rotational direction, said mounting comprising an inner rigid gimbal frame adapted to be connected to a structure to be supported and having diametrically opposed outwardly extending projections, an intermediate rigid gimbal frame disposed about and spaced from said inner frame and having diametrically opposed pockets receiving said inner frame projections, means mounting said inner frame projections in said intermediate frame pockets for relative translational movement axially of said inner frame projections, said means including elastomeric means mounting at least one of said projections in one of said pockets and accommodating said relative translational movement predominately in shear, said intermediate rigid frame having diametrically opposed projections extending outwardly therefrom at substantially a right angle to said inner frame projections, an outer rigid gimbal frame adapted to be mounted on a supporting structure disposed about and spaced from said intermediate frame and having diametrically opposed pockets receiving said intermediate frame projections, means mounting said intermediate frame projections in said outer frame pockets for relative translational movement axially of said intermediate frame projections, said latter means including elastomeric means mounting at least one of said latter projections in one of said latter pockets and accommodating said latter relative translational movement predominately in shear, said elastomeric means being resistant to relative rotational movement between said inner and intermediate and intermediate and outer frames, respectively, in a plane parallel to the axes of said inner and intermediate frame projections by being predominately loaded in compression.

3. A resilient gimbal mounting, as set forth in claim 2, wherein said elastomeric means mounting said inner frame projections in one of said intermediate frame pockets comprises a body of elastomer interposed and secured radially between opposed sides of said pocket, and an elongate shim of nonextensible material embedded in and bonded to said elastomer body and extending parallel to the axes of said projection.

4. A resilient gimbal mounting, as set forth in claim 3 wherein said body of elastomer and shim of nonextensible material are tubular and are concentrically disposed about the axis of said projection.

5. A resilient gimbal mounting, as set forth in claim 2, wherein said elastomeric means mounting said intermediate frame projection in one of said outer frame pockets comprises a body of elastomer interposed and secured radially between opposite sides of said projection and the walls of said pocket, and at least one elongate shim of nonextensible material embedded in and bonded to said elastomer body and extending parallel to the axis of said projection.

6. A resilient gimbal mounting characterized in its relatively low spring rate in designated translational directions while having a relatively high spring rate in at least one designated rotational direction, said mounting comprising
   an inner rigid gimbal frame adapted to be connected to a structure to be supported and having diametrically opposed outwardly extending projections,
   an intermediate rigid gimbal frame disposed about and spaced from said inner frame and having diametrically opposed pockets receiving said inner frame projections,
   means mounting said inner frame projections in said intermediate frame pockets for relative translational movement axially of said inner frame projections, said means including elastomeric means mounting at least one of said projections in one of said pockets and accommodating said relative translational movement predominately in shear,
   said intermediate rigid frame having diametrically opposed projections extending outwardly therefrom at substantially a right angle to said inner frame projections,
   an outer rigid gimbal frame adapted to be mounted on a supporting structure disposed about and spaced from said intermediate frame and having diametrically opposed pockets receiving said intermediate frame projections,
   elastomeric means mounting said intermediate frame projections in said outer frame pockets for relative translational movement axially of said intermediate frame projections and mutually perpendicular to the axis of said inner and intermediate frame projections and accommodating said relative translational movements predominately in shear,
   each of said elastomeric means being resistant to relative rotational movement between said inner and intermediate and intermediate and outer frames, respectively, in a plane parallel to two of the axes of relative translational movement by being predominately loaded in compression.

7. A resilient gimbal mounting, as set forth in claim 6, wherein said elastomeric means mounting at least one of said inner frame projections in one of said intermediate frame pockets comprises an elongate tubular body of elastomer cocentrically disposed about said projection and secured between said projection and the wall of said pocket, and an elongate shim of nonextensible material concentrically disposed about said projection embedded in and bonded to said elastomer body, and wherein each of said elastomeric means mounting said intermediate frame projections in said outer frame pockets comprises a rigid block mounted on said projections and having opposed planar surfaces extending parallel to the axis of said projection and perpendicular to the axis of said inner frame projections, a body of elastomer disposed and secured between each of the planar surfaces of said block and the walls of said pockets and at least one planar shim of nonextensible material embedded in and bonded to each of said elastomer bodies and extending parallel to the planar surfaces of said block.

8. A mounting system characterized in its66 relatively low spring rate in designated translational directions while having a relatively high spring rate in at least one designated rotational direction, said mounting system comprising bracket means having spaced apart support members and resilient gimbal mountings carried by said support members in axially spaced relation for supporting structure therebetween, each of said resilient gimbal mountings comprising ani inner rigid gimbal frame adapted to be connected to a structure to be supported, an intermediate rigid gimbal frame disposed about and spaced from said inner frame, elastomeric means mounting said inner frame and intermediate frame for resilient relative translational movement along a first axis and accommodating said relative translational movement predominately in shear, an outer rigid gimbal frame carried by one of said support members disposed about and spaced from said intermediate frame, and elastomeric means mounting said intermediate frame and outer frame for resilient relative translational movement along a second axis at substantially a right angle to said first translational axis and accommodating said latter translational movement predominately in shear, said elastomeric means being resistant to relative rotational movement between said inner and intermediate and intermediate and outer frames, respectively, in a plane parallel to each of said translational axis by predominately loaded in compression.

9. A mounting system characterized in its relatively low spring rate in designated translational directions while having a relatively high spring rate in at least one designated rotational direction, said mounting system comprising bracket means having spaced apart support members and resilient gimbal mountings carried by said support members in axially spaced relation for supporting a structure therebetween, each of said resilient gimbal mountings comprising an inner rigid gimbal frame adapted to be connected to a structure to be supported, an intermediate rigid gimbal frame disposed about and spaced from said inner frame, elastomeric means mounting said inner frame and intermediate frame for resilient relative translational movement along a first axis perpendicular to the axial spacing of said gimbal mountings and accommodating said relative translational movement predominately in shear, an outer rigid gimbal frame carried by one of said support members disosed about and spaced from said intermediate frame, elastomeric means mounting said intermediate frame and outer frame for resilient relative translational movement along a second and third axis mutually perpendicular to each other and said first axis and accommodating said translational movement predominately in shear, said elastomeric means being resistant to relative rotational movement between said inner and intermediate and intermediate and outer frames, respectively, in a plane perpendicular to the axial spacing of said gimbal mountings by being predominately loaded in compression.

* * * * *